(12) United States Patent
Matsumoto et al.

(10) Patent No.: US 7,886,181 B2
(45) Date of Patent: Feb. 8, 2011

(54) FAILURE RECOVERY METHOD IN CLUSTER SYSTEM

(75) Inventors: Hirokazu Matsumoto, Yokohama (JP); Tsunehiko Baba, Hachioji (JP); Shinji Hamada, Yokohama (JP); Takashi Ichimura, Yokohama (JP); Noriaki Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 401 days.

(21) Appl. No.: 12/041,059

(22) Filed: Mar. 3, 2008

(65) Prior Publication Data

US 2009/0138757 A1 May 28, 2009

(30) Foreign Application Priority Data

Nov. 28, 2007 (JP) ............................. 2007-307106

(51) Int. Cl.
*G06F 11/00* (2006.01)
(52) U.S. Cl. ............................................. 714/2; 714/6
(58) Field of Classification Search ...................... 714/2
See application file for complete search history.

(56) References Cited

U.S. PATENT DOCUMENTS

| 7,111,084 | B2 * | 9/2006 | Tan et al. ................... 710/15 |
| 7,260,625 | B2 * | 8/2007 | Sugiura et al. .............. 709/223 |
| 7,318,116 | B2 * | 1/2008 | Gallo et al. ................. 711/100 |
| 2005/0015657 | A1 * | 1/2005 | Sugiura et al. ................. 714/6 |
| 2005/0234919 | A1 * | 10/2005 | Maya et al. ................... 707/10 |
| 2009/0106328 | A1 * | 4/2009 | Callaway et al. ............ 707/202 |

FOREIGN PATENT DOCUMENTS

| JP | 05250197 | 9/1993 |
| JP | 9-168015 | 6/1997 |

* cited by examiner

*Primary Examiner*—Scott T Baderman
*Assistant Examiner*—Kamini Patel
(74) *Attorney, Agent, or Firm*—Brundidge & Stanger, P.C.

(57) ABSTRACT

There is provided a method executed in a cluster system comprising a first computer and at least one second computer that stores the data transmitted from the first computer. The method comprising the steps of: judging whether the failure-occurred processing is restarted by the first computer or the failure-occurred processing is switched over by the second computer based on the system information; receiving the stored data from the second computer and re-executing the processing in which the failure has occurred by the first computer, in the case of which it is judged that the processing in which the failure has occurred is restarted by the first computer; and executing, by the second computer, the processing in which the failure has occurred, in the case of which it is judged that the processing in which the failure has occurred is switched over by the at least one second computer.

14 Claims, 13 Drawing Sheets

FAILURE RECOVERY METHOD IN CLUSTER SYSTEM

CLAIM OF PRIORITY

The present application claims priority from Japanese patent applications JP 2007-307106 filed on Nov. 28, 2007, the content of which are hereby incorporated by reference into this application.

BACKGROUND OF THE INVENTION

This invention relates to a technology of recovering a failure in a cluster system including an active system computer and a standby system computer.

Conventionally, in a cluster system in which processing data is held in a nonvolatile shared disk and which includes an active system computer and a standby computer, when a failure has occurred in the process of the active system, recovery from the failure is performed by restarting the process or switching to a standby system.

In a cluster system using a volatile memory instead of a nonvolatile shared disk to improve the processing performance, when a process failure has occurred in the active system, the recovery processing cannot be performed because data is lost. Therefore, as recovery means in a case where a failure has occurred in the process of the active system, there is disclosed a technology in which a copy of data necessary for restart is transferred to another computer, and when the process is restarted, data copied in the another computer is used to perform the restart (refer to JP 09-168015 A). According to the technology disclosed in JP 09-168015 A, in order to copy data, the computer that transfers the data and the computer to which the data is transferred are circularly disposed, and the data is duplicated in all the computers.

However, according to the technology disclosed in JP 09-168015 A, because the data is merely duplicately protected, the recovery processing cannot be executed, if a failure has occurred in the computer where the data is copied, before the completion of the process restart.

Moreover, because the process restart by the same system is invariably executed and data transfer from another system is attempted when a process failure has occurred in the active system, there is a possibility that the processing time may become longer compared with system switching to the standby system.

SUMMARY OF THE INVENTION

An object of this invention is to provide a process recovery method with which the speed of the recovery processing is increased while the possibility of loss of processing data is minimized.

A representative aspect of this invention is as follows. That is, there is provided a method for recovering a failure occurred in a first computer which is installed in a cluster system comprising a first computer that executes processing for providing service and at least one second computer that holds a copy of data processed by the first computer. The first computer has a first processor, a first storage unit coupled to the first processor, and a first interface coupled to the at least one second computer. Each of the second computer has a second processor, a second storage unit coupled to the second processor, and a second interface coupled to the first computer. The first storage unit stores data used for the processing. The cluster system holds system information including a state of the cluster system. The method comprising the steps of: transmitting, by the first computer, the data stored in the first storage unit to the second computer; storing, by the second computer, the data transmitted from the first computer in the second storage unit; judging, by the first computer, whether the failure-occurred processing is restarted by the first computer or the failure-occurred processing is switched over by the second computer based on the system information in the case of which a failure has occurred in the first computer; transmitting, by the second computer, the data stored in the second storage unit to the first computer in the case of which it is judged that the processing in which the failure has occurred is re-executed by the first computer, storing, by the first computer, the transmitted data in the first storage unit, and restarting, by the first computer, the processing in which the failure has occurred; and executing the processing in which the failure has occurred, by the second computer, in case of which it is judged that the processing in which the failure has occurred is switched over by the second computer.

According to an aspect of this invention, the speed and reliability of the processing can be increased by determining which of the process restart and the system switching is performed, based on the system state.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Hereinafter, embodiments of this invention will be described with reference to the drawings.

First Embodiment

Figure 1:
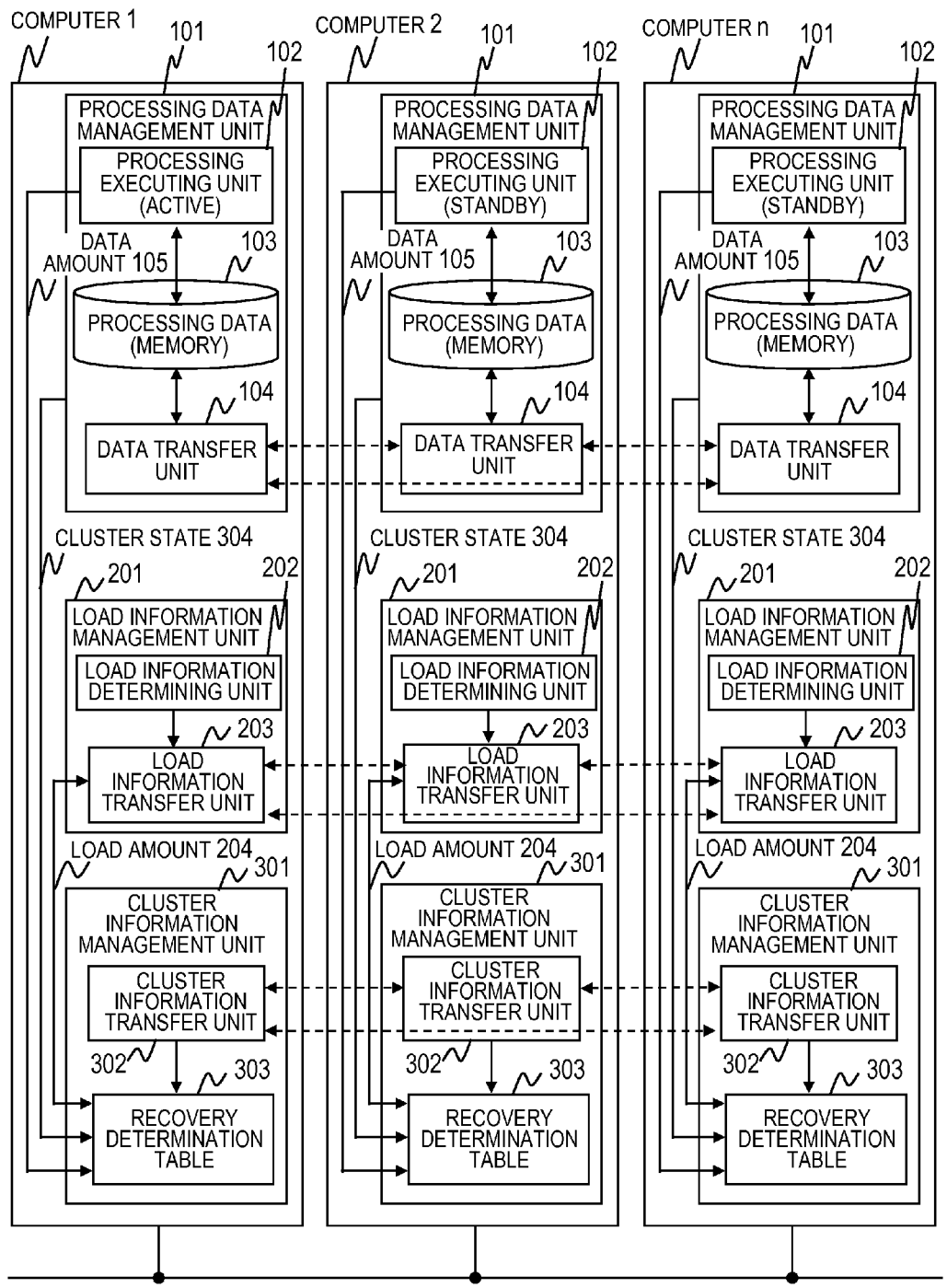
FIG. 1 is a block diagram showing an example of a system structure of a cluster system in accordance with a first embodiment of this invention.

FIG. 1 is a system structure diagram showing an example of a cluster system of a first embodiment of this invention.

The cluster system of the first embodiment of this invention includes an active system computer 1 and a plurality of standby system computers 2 to n.

The active system computer and the standby system computer each include a processing data management unit 101, a load information management unit 201, and a cluster information management unit 301. The active system computer and the standby system computer included in the cluster system have the same structure. When the processing of the active system computer is taken over by a standby system computer by system switching, the standby system computer taking over the processing operates as the active system computer thereafter. If possible, the computer that operated as the active system computer may be operated as a standby system computer.

The processing data management unit 101 has a processing executing unit 102 and processing data 103. The processing executing unit 102 executes the required processing. The processing data 103 is data necessary for the processing executed by the processing executing unit 102. The processing data 103 is stored in a volatile memory to increase the processing speed. The processing data 103 may be stored in a database.

The processing data management unit 101 notifies a recovery determination table 303 of a cluster state 304 indicating whether the own system is an active system or a standby system. The processing executing unit 102 calculates a data amount 105 necessary for the recovery of each module of a processing management unit 100. Further, the processing executing unit 102 notifies the cluster information management unit 301 of the data amount 105, and records it into the recovery determination table 303. The processing executing unit 102 is further provided with a function of monitoring the operating state of each module and a function of notifying the cluster information management unit 301 of a process failure when a failure has occurred. The process failure notification includes information on the module in which the failure has occurred. The modules will be described in detail with reference to FIG. 6.

The processing data management unit 101 is further provided with a data transfer unit 104 that transfers and receives data to and from another system. The data transfer unit 104 transfers the processing data 103 processed by the processing executing unit 102, to another computer, and receives the processing data transferred from another computer. In the first embodiment of this invention, the processing data 103 stored in the memory of the active system computer is all transferred to all the standby system computers, and stored in the memories of the computers.

The method of the processing data transfer by the data transfer unit 104 may be unicast in which data is individually transmitted to each computer or may be multicast in which data is simultaneously transmitted to all the computers in the system. The amount of data to be transferred can be reduced by multicast.

According to the data transfer amount, the data transfer unit 104 may suppress the transfer amount by compressing data in advance or at the time of transfer or may use a plurality of transfer paths with higher priority over other processings in use of transfer paths.

Further, in the first embodiment of this invention, the processing data is synchronously transferred to another system by the data transfer unit 104. In a case where the processing data is asynchronously transferred, there is a possibility that the processing data is partly lost when a failure has occurred. Therefore, this is applicable when the system permits partial loss of the processing data such as when data reproduction is possible, or when data retransmission from a higher level system or the like is possible. In the case of the asynchronous transfer, because the processing of the own system can be continued without a wait for the completion of storage of the processing data after the processing data is transferred to another system, the processing performance can be improved.

The load information management unit 201 has a load information determining unit 202 and a load information transfer unit 203. The load information determining unit 202 determines the load information of the computers. The load information transfer unit 203 transfers the load information to another system, and receives the load information transferred from another system. Further, the load information transfer unit 203 notifies the recovery determination table 303 of the load amount 204 which is the information concerning the load on the own system or another system at predetermined intervals. The load information transfer unit 203 may notify another system of the load amount at the time of occurrence of a failure instead of notifying another system of the load amount at predetermined intervals. In this case, the system that takes over may be determined by another system.

The cluster information management unit 301 has a cluster information transfer unit 302 and a recovery determination table 303. The cluster information transfer unit 302 transfers the cluster information to another system, and receives the cluster information transferred from another system. The recovery determination table 303 stores the data amount 105 processed by the processing executing unit 102, the cluster state 304, and the load amount 204 of the own system and another system.

The cluster information management unit 301 monitors the processing data management unit 101 to thereby detect a process failure of the own system. The monitoring of the processing data management unit 101 may be performed by using the communication of the data amount 105 as the heart beat or by detecting whether the load amount has been successfully measured or not by the communication of the load amount 204. Alternatively, the processing data management unit 101 may be monitored directly or indirectly by a different communication.

When detecting a process failure of the own system, the cluster information management unit 301 determines which of the process restart and the system switching is executed, based on a determination criterion described later. When the process restart is executed, the processing data management unit 101 is instructed to restart the process. Receiving the instruction to restart the process, the processing data management unit 101 obtains data necessary for the process restart by requesting the transfer of data copied in another system through the data transfer unit 104. After the data is obtained, all or part of the process of the processing data management unit 101 in which the failure has occurred is restarted to complete recovery.

On the other hand, when the system switching is executed, the cluster information management unit 301 instructs another system to which switching is made, to take over through the cluster information transfer unit 302. The system instructed to take over obtains the copied data by the data transfer unit 104 and executes the process to thereby complete the recovery by the system switching.

Further, when cluster information from another system cannot be received by the cluster information transfer unit 302 for a predetermined period of time, the cluster information management unit 301 recognizes that a failure has occurred in the system from which the cluster information cannot be received. The cluster information management unit 301 has a function of executing the system switching by starting the process with the use of the copied processing data when a failure has occurred in the other systems. Here, it is necessary to perform control so that the system switching processing executed by the detection of a failure in another system does not overlap the processing to provide an instruction to restart the process of the system in which a failure has occurred or perform the system switching. For example, the system switching processing may be executed after a wait of the time necessary for the completion of the restart of the process of the system in which a failure has occurred or the system switching, or may be executed after confirming that the recovery processing is not executed in the system in which a failure has occurred. Further, shared resources such as a shared disk and the IP address may be exclusively controlled so that the process is not simultaneously taken over by a plurality of computers.

Figure 2:
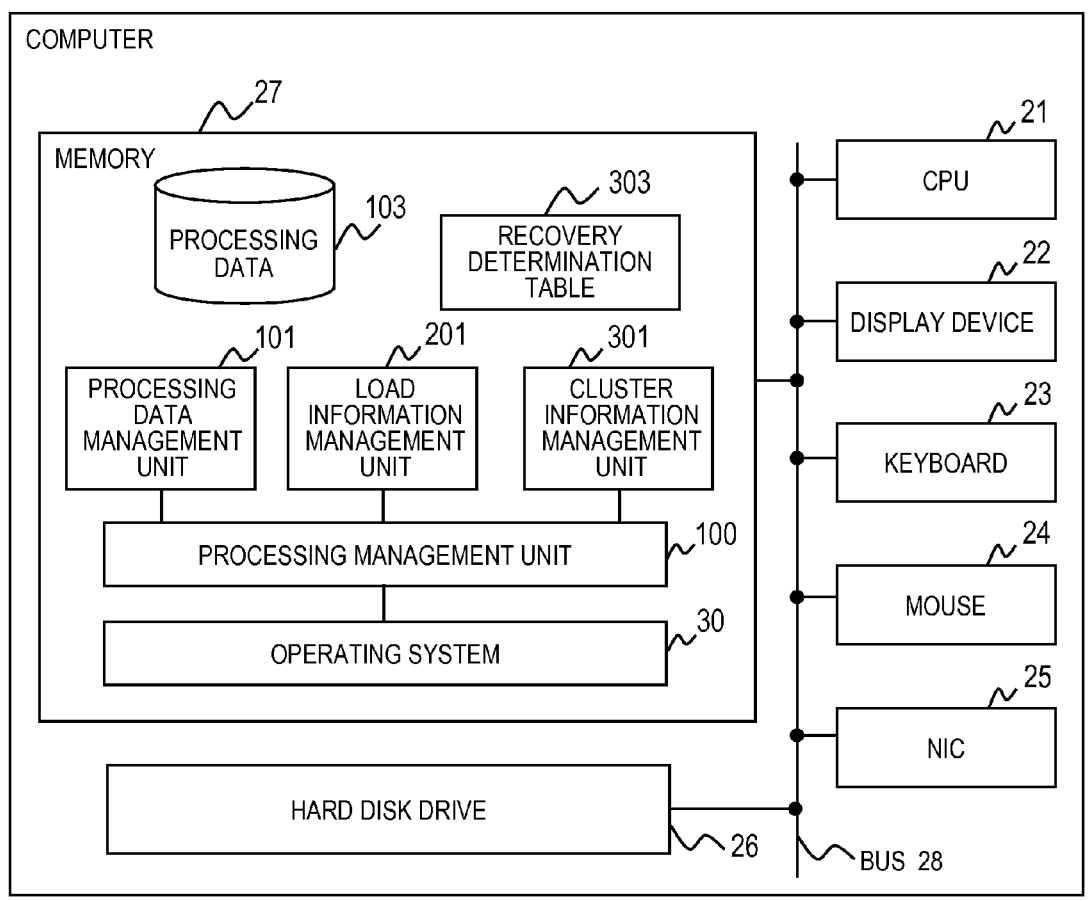
FIG. 2 is a block diagram showing a hardware configuration of a computer in accordance with the first embodiment of this invention.

FIG. 2 is a view showing the hardware configuration of the computer of the first embodiment of this invention.

The active system computer and the standby system computer have the same structure as mentioned above. The computers each include a CPU 21, a display device 22, a keyboard 23, a mouse 24, a network interface card (NIC) 25, a hard disk drive 26, and a memory 27. The CPU 21, the display device 22, the keyboard 23, the mouse 24, the network interface card 25, the hard disk drive 26, and the memory 27 are coupled by a bus 28.

The active system computer and the standby system computer couple with a network through the NIC 25, and intercommunicate with the other computers.

The CPU 21 executes the programs stored in the memory 27. The memory 27 stores the programs executed by the CPU 21 and the data necessary for the execution of the programs. The memory 27 stores the processing management unit 100, an operating system 30, the processing data management unit 101, the load information management unit 201, the cluster information management unit 301, the processing data 103, and the recovery determination table 303. The memory 27 is a volatile memory as mentioned above.

The processing management unit 100 is a program executed on the operating system 30. The processing data management unit 101, the load information management unit 201, and the cluster information management unit 301 are programs called up by the processing management unit 100. With respect to the processing data management unit 101, the load information management unit 201, and the cluster information management unit 301, the processing described with reference to FIG. 1 is executed.

The processing data 103 is data necessary for processing. As mentioned above, the processing data 103 may be managed by a database management system. In this case, the database management system is stored in the memory 27. As described with reference to FIG. 1, the recovery determination table 303 stores information such as the cluster information necessary for recovery from a failure occurring in the active system computer.

The display device 22 displays various pieces of information such as the result of execution of processing. The keyboard 23 and the mouse 24 accept inputs from the user. The NIC 25 couples with a network. The hard disk drive 26 stores the processing data stored in the memory 27 and the programs loaded in the memory 27.

Figure 3:
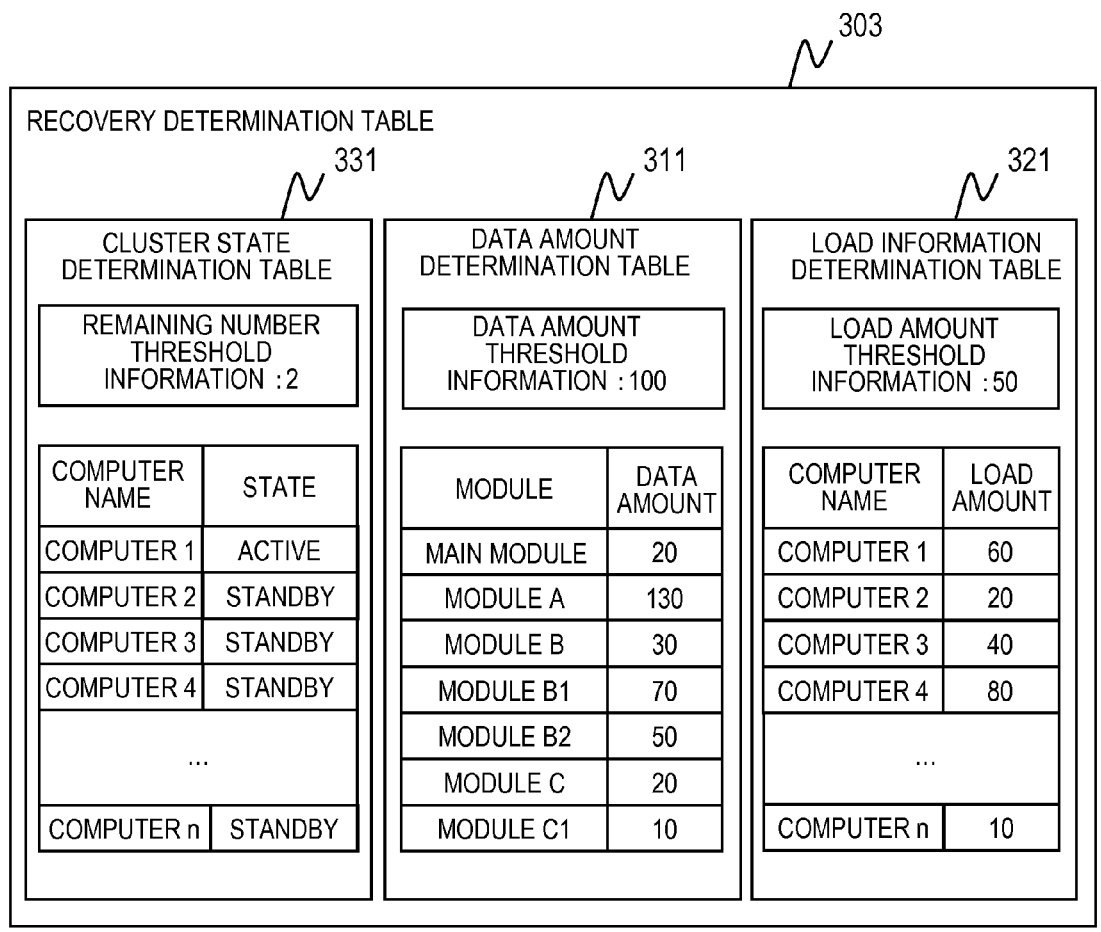
FIG. 3 is an explanatory diagram showing a configuration of a recovery determination table in accordance with the first embodiment of this invention.

FIG. 3 is a view showing the configuration of the recovery determination table 303 of the first embodiment of this invention.

The recovery determination table 303 includes a cluster state determination table 331, a data amount determination table 311, and a load information determination table 321.

The cluster state determination table 331 includes the cluster state 304 of each computer and the threshold information of the number of remaining computers set by the user or the system. While in the first embodiment of this invention, three states, "active system", "standby system", and "down" including a state where the process is down, are defined as the cluster state, more detailed states may be defined as the cluster state. For example, a state where a computer is activated as a standby system may be included. In this case, the computer may be treated as a standby system since it serves as a standby system after activated, or may be not treated as a standby system since it is not serving as a standby system at that stage.

Figure 7:
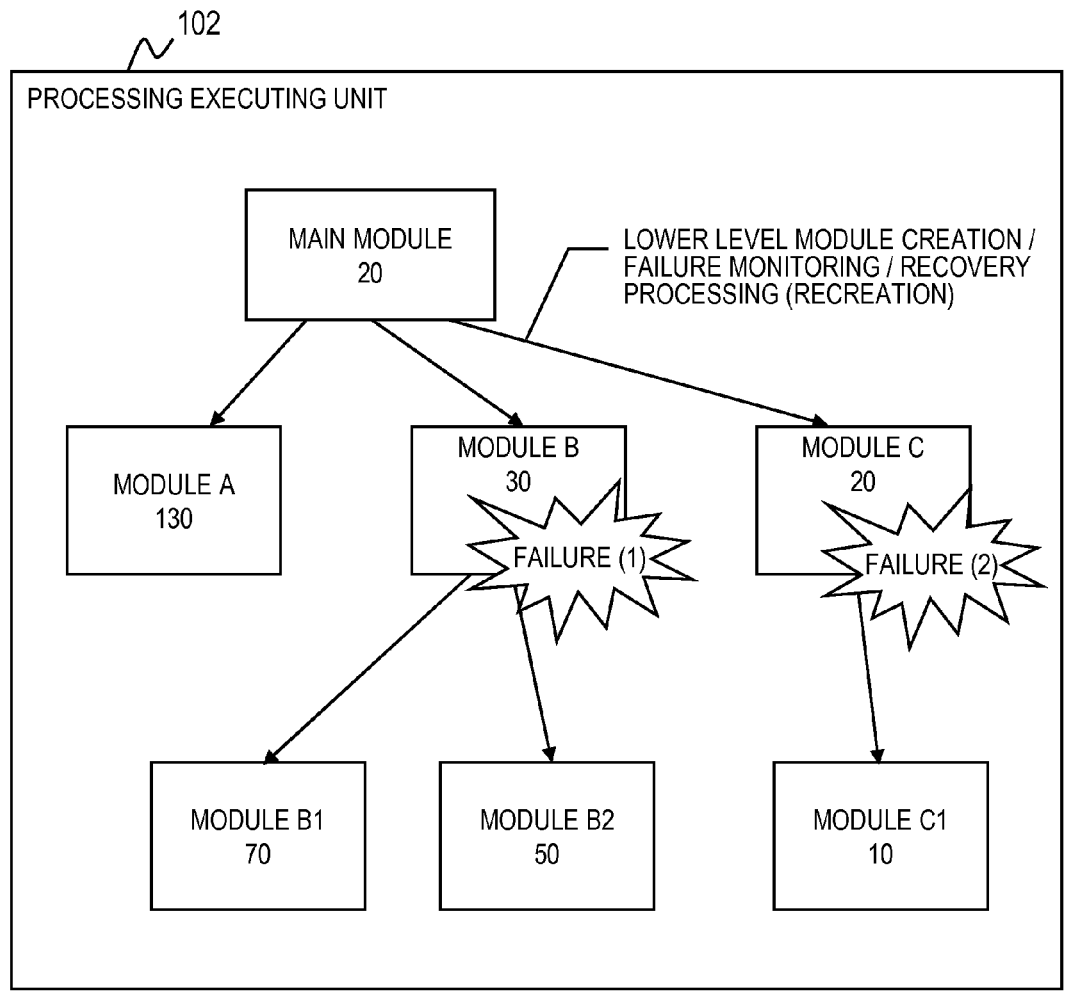
FIG. 7 is an explanatory diagram showing an example of a processing for recovery from a failure based on the data amount determination table in accordance with the first embodiment of this invention.

The data amount determination table 311 includes the data amount of each of the modules constituting the processing executing unit 102, the threshold information of the data amount set by the user or the system, and information indicating dependence relation among the modules. The dependence relation may be expressed, for example, by an identifier naming rule as shown in FIG. 7. When the dependence relation is expressed by the identifier naming rule, first, the first stage modules which are lower level modules directly called up by the main module are assigned identifiers represented by alphabets (A-Z). The second stage modules called up by the first stage modules, respectively, are assigned identifiers obtained by adding numerals (1 to 9) to the identifiers of the first stage modules. The information indicating dependence relation among the modules may be expressed by a different means such as a tree structure. Further, the information indicating dependence relation among the modules may be held in a table different from the data amount determination table 311.

The load information determination table 321 holds the load amounts 204 of the computers. The load information determination table 321 includes the threshold information of the load amount set by the user or the system and the load amounts of the computers. The load amount may be, for example, the data amount of an object to be processed or time required for the processing, or a value calculated by a calculation formula with information such as the data amount as a variable.

Figure 4:
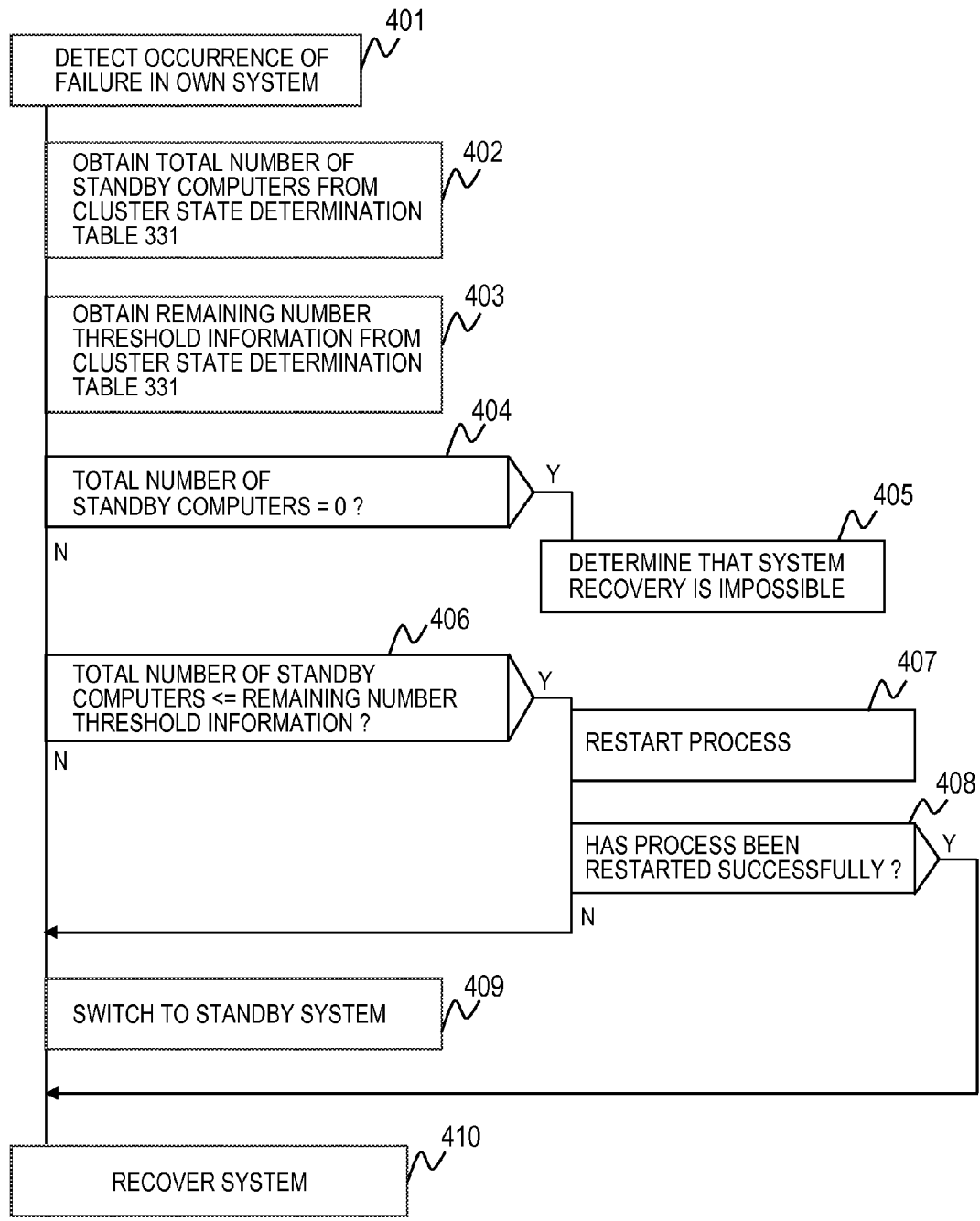
FIG. 4 is a diagram showing a procedure of a processing for recovery from a failure based on a cluster state determination table in accordance with the first embodiment of this invention.

FIG. 4 is a diagram showing the procedure of the processing for recovery from a failure based on the cluster state determination table 331 by the cluster information management unit 301 of the first embodiment of this invention.

In the failure recovery processing shown in FIG. 4, control is performed by the cluster information management unit 301 so that the number of remaining standby system computers is not smaller than the threshold in order to prevent the processing data 103 from being lost because of all the computers stopping due to a failure or the like.

When the occurrence of a failure in the own system (active system) has been detected (Step 401), the CPU 21 calculates the total number of standby computers with reference to the cluster state determination table 331 (Step 402). Further, the CPU 21 obtains the remaining number threshold information from the cluster state determination table 331 (Step 403).

The CPU 21 determines whether the number of standby computers is zero or not (Step 404). When the number of standby computers is zero (the result of Step 404 is "Y"), because the data necessary for recovery is absent, the CPU 21 determines that system recovery is impossible (Step 405), and ends the processing. In Step 405, data protection processing such as copying the processing data 103 onto a nonvolatile disk may be executed instead of ending the processing.

When the number of standby computers is larger than 0 (the result of Step 404 is "N"), the CPU 21 determines whether or not the total number of standby computers is equal to or less than the remaining number threshold information (Step 406). When the total number of standby computers is equal to or less than the remaining number threshold information (the result of Step 406 is "Y"), the CPU 21 attempts to restart the process (Step 407). Further, the CPU 21 determines whether the process has been restarted successfully or not (Step 408).

On the other hand, when the total number of standby computers is larger than the remaining number threshold information (Step 406) or when the process restart is unsuccessful (the result of Step 408 is "N"), the CPU 21 switches to a standby system (Step 409). When the switching to the standby system has been completed or when the process has been restarted successfully (the result of Step 408 is "Y"), the system can be recovered (Step 410).

Figure 5A:
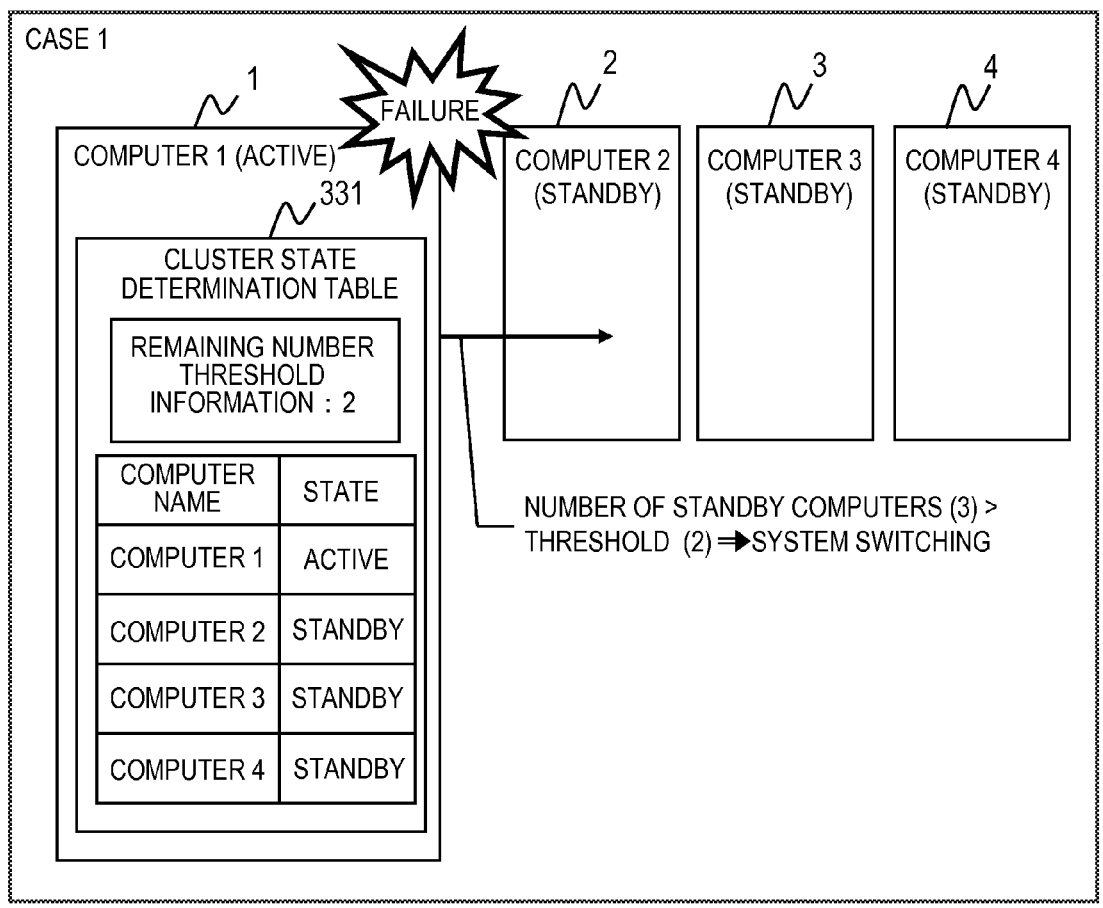
FIG. 5A is an explanatory diagram showing an example of a processing for recovery from a failure with restarting a process based on the cluster state determination table in accordance with the first embodiment of this invention.
Figure 5B:
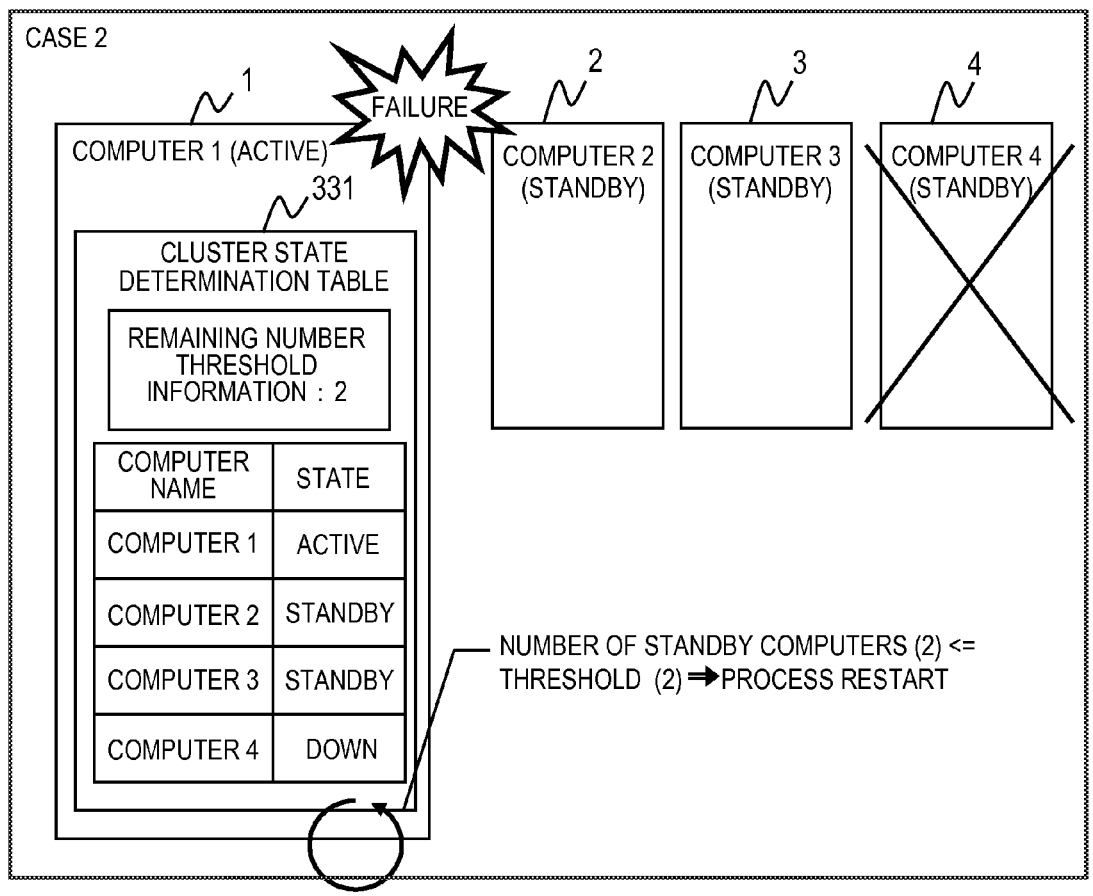
FIG. 5B is an explanatory diagram showing an example of a processing for recovery from a failure with switching to a standby system based on the cluster state determination table in accordance with the first embodiment of this invention.

FIGS. 5A and 5B are diagrams each showing an example of the processing for recovery from a failure based on the cluster state determination table 331 of the first embodiment of this invention.

In Case 1 shown in FIG. 5A, a computer 1 is the active system, and computers 2 to 4 are standby systems. The cluster state determination table 331 of the computer 1 stores the cluster state of each of the computers.

When a failure has occurred in the active system computer 1, the number of operating standby system computers is compared with the remaining number threshold information. In Case 1, because the number of remaining standby computers is three, which is larger than the threshold (two), switching to a standby system is performed.

In Case 2 shown in FIG. 5B, a computer 1 is the active system, computers 2 and 3 are standby systems, and a computer 4 is down due to a failure. When a failure has occurred in the active system computer 1, because the number of remaining standby system computers is two, which is equal to or less than the value of the remaining number threshold information (two), the computer 1 obtains data from a standby system, and attempts to restart the process.

Figure 6:
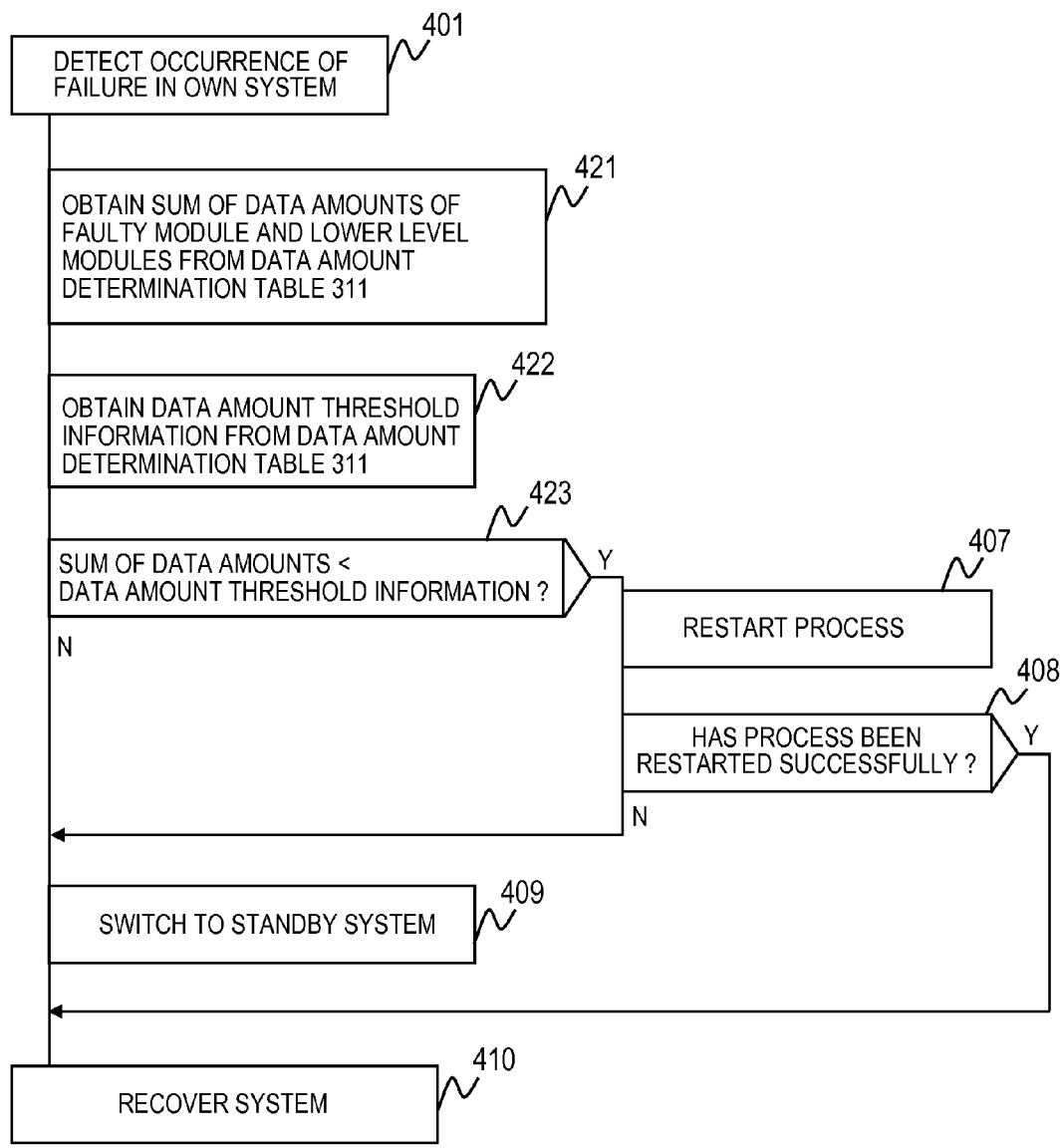
FIG. 6 is a diagram showing a procedure of a processing for recovery from a failure based on a data amount determination table in accordance with the first embodiment of this invention.

FIG. 6 is a diagram showing the procedure of the processing for recovery from a failure based on the data amount determination table 311 by the cluster information management unit 301 of the first embodiment of this invention.

In the first embodiment of this invention, the processing executing unit 102 is divided in units of modules according to the functions. The module that is executed first when a processing is executed is the main module. The modules form a hierarchical structure for each function. Higher level modules create lower level modules, and monitor whether a failure has occurred in the lower level modules or not. When a failure has occurred, the processing executing unit 102 notifies the cluster information management unit 301 of the module in which the failure has occurred.

Then, referring to the data amount determination table 311, the cluster information management unit 301 identifies the module requiring recovery. When a failure has occurred in a lowest level module, it is necessary to recover the module by recreating the module. When a failure has occurred in a module having lower level modules, it is necessary to recover all the lower level modules.

The modules require the processing data 103 when executing the processing. When the process is restarted, it is necessary to obtain necessary data from a standby system for each module in which a failure has occurred. When the amount of data required by each module is large, there are cases where the processing time in the data transfer is long and the time required for the recovery processing is long compared with that required for the system switching. Therefore, when the data transfer amount is large, recovery can be performed faster by executing system switching. In this processing, whether to restart the process or execute system switching is determined based on the data transfer amount, and the system is recovered.

When the occurrence of a failure in the own system (active system) is detected (Step 401), the CPU 21 identifies the faulty module and the lower level modules dependent on the faulty module with reference to the data amount determination table 311, and calculates the sum of the data amounts of all the modules (Step 421). Further, the CPU 21 obtains the data amount threshold information from the data amount determination table 311 (Step 422).

The CPU 21 determines whether the sum of the data amounts is smaller than the value of the data amount threshold information or not (Step 423). When the sum of the data amounts is smaller than the value of the data amount threshold information (the result of Step 423 is "Y"), because the amount of data transferred from the standby system computer is small, the CPU 21 attempts to restart the process (Step 407). Further, the CPU 21 determines whether the process has been restarted successfully or not (Step 408).

On the other hand, when the sum of the data amounts is equal to or more than the value of the data amount threshold information (the result of Step 406 is "N") or when the process restart is unsuccessful (the result of Step 408 is "N"), the CPU 21 switches to a standby system (Step 409). When the switching to the standby system has been completed or the process has been restarted successfully (the result of Step 408 is "Y"), the system can be recovered (Step 410).

While FIG. 6 shows an example in which whether to restart the process or not is determined for only a module in which a failure has occurred, for the higher level module on which the faulty module is dependent, the module restart may be performed recursively. For example, the restart of the higher level module is recursively executed before the processing of Step 409 to execute system switching. When the module restart is recursively performed as described above, the process may be restarted unconditionally without the sum of the data amounts compared with the threshold.

When the detected failure is due to lack of memory resource in the own process, there are cases where recovery can be performed by initializing the memory state by the process restart. Therefore, a processing may be added of calculating the data amounts of all the modules under the main module first and determining which of the process restart and the system switching is executed, based on the calculated value.

FIG. 7 is a diagram showing an example of the processing for recovery from a failure based on the data amount determination table 311 of the first embodiment of this invention.

In FIG. 7, a case in which a failure (1) and a failure (2) occur will be described. In the description of FIG. 7, as the data amount determination table 311 serving as the reference for determining whether to restart the process or not, the data amount determination table 311 of the recovery determination table 303 shown in FIG. 3 is used.

The failure (1) represents a case where a failure has occurred in a module B. In this case, first, whether or not a lower level module is present under the module B in which the failure has occurred is determined based on the dependence among the modules included in the data amount determination table 311.

By referring to the data amount determination table 311, it is found that a module B1 and a module B2 are present as lower level modules of the module B and the processing data of the modules needs to be transferred from a standby system. Calculating the sum of the processing data amounts of the module B, the module B1 and the module B2, 150 (=30+70+50) is obtained. Further, the sum of the processing data amounts is compared with the threshold stored in the data amount determination table 311, and it is determined whether process restart is necessary or not. For the failure (1), because the sum (150) of the data amounts of the modules is larger than the threshold (100), system switching is made without restarting the process.

On the other hand, the failure (2) represents a case where a failure has occurred in a module C. Likewise, the sum of the processing data of the module C and a module C1 which is the lower level module is calculated from the data amount determination table 311, and compared with the threshold. For the failure (2), because the sum (30) of the data amounts of the modules is smaller than the threshold (100), process restart is executed.

Figure 8:
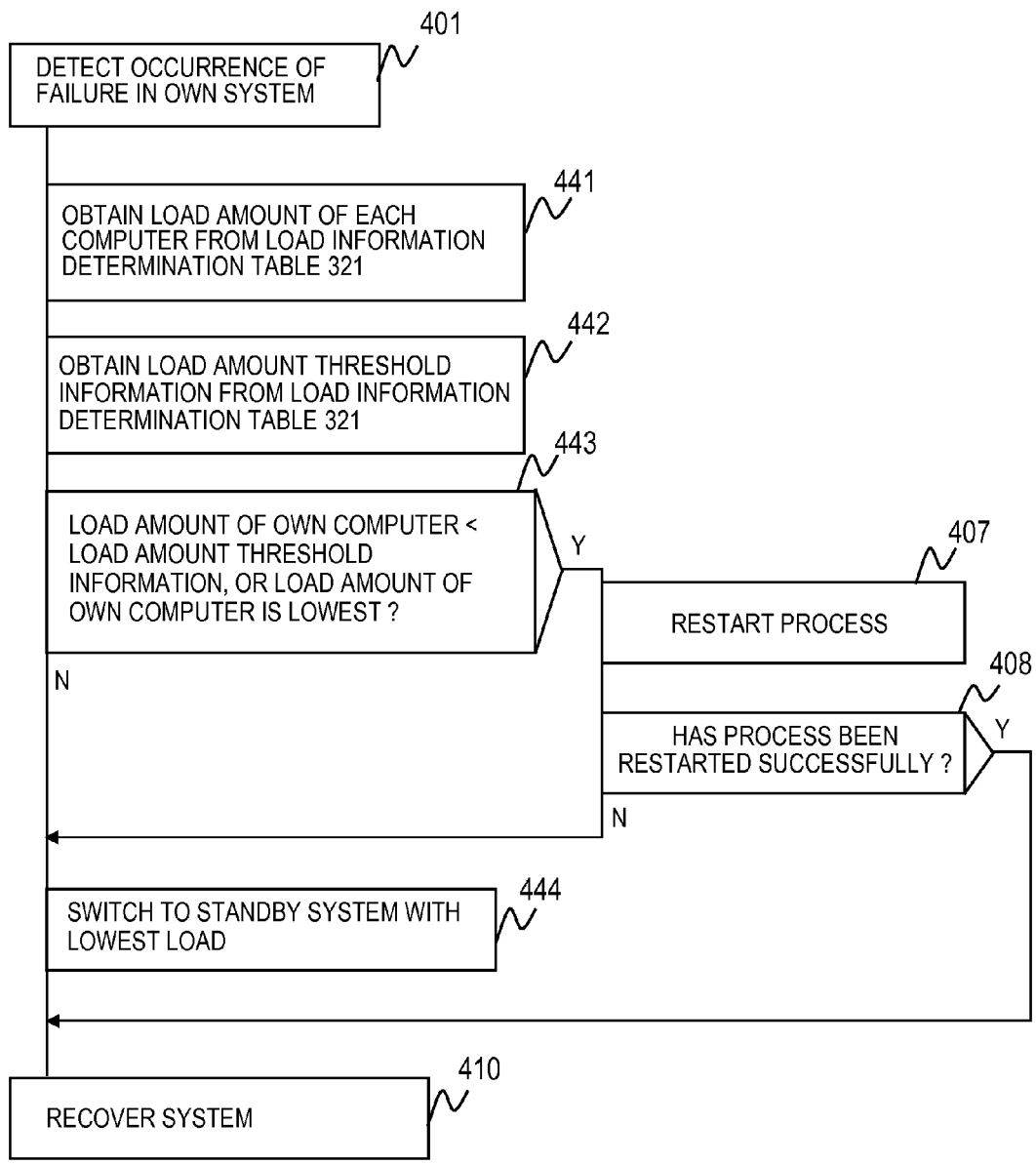
FIG. 8 is a diagram showing a procedure of a processing for recovery from a failure by a load information determining unit in accordance with the first embodiment of this invention.

FIG. 8 is a diagram showing the procedure of the processing for recovery from a failure by the load information determining unit 202 of the first embodiment of this invention.

When recovery from a failure is performed by the process restart or the system switching, if the load on the computer executing the processing is high, the time required for the recovery processing may become longer, and further, there is a possibility that the recovery processing cannot be performed normally. Therefore, in the recovery processing shown in FIG. 8, the recovery processing is executed so that the processing is continued in a computer with a load that is as low as possible.

The amount of load on each computer is a value determined by a method determined based on a predetermined reference. For example, the load amount is calculated by weighting one or a plurality of pieces of information. Examples of the reference of the load amount include the CPU utilization, the network usage rate, and the amount of data where processing has not been completed. An example of the weighting method is a method using a previously defined calculation formula by using a value calculated based on the above-mentioned reference of the load amount and the past execution time.

The load information management unit 201 calculates the load amount at predetermined intervals, and transfers the load amount to another system by the load information transfer unit 203. When the load amount from another system cannot be received at predetermined intervals, it is determined that the amount of load on the system is high, and the maximum value is set as the load amount. Moreover, the load information management unit 201 notifies the cluster information management unit 301 of the own system of the calculated load amount of the own system and the received load amount of another system. The cluster information management unit 301 stores the notified load amount in the load information determination table 321 of the recovery determination table 303.

When detecting the occurrence of a failure in the own system (active system) (Step 401), the CPU 21 obtains the load amount of each computer with reference to the load information determination table 321 (Step 441). Further, the CPU 21 obtains the load amount threshold information from the load information determination table 321 (Step 442).

The CPU 21 determines whether or not the load amount of the own system is lower than the value of the load amount threshold information or whether or not the load amount of the own system is the lowest (Step 443). When the load amount of the own system is lower than the value of the load amount threshold information or when the load amount of the own system is the lowest (the result of Step 443 is "Y"), the CPU 21 attempts to restart the process (Step 407). Further, the CPU 21 determines whether or not the process has been restarted successfully (Step 408).

On the other hand, when the load amount of the own system is equal to or more than the value of the load amount threshold information and the load amount of the own system is not the lowest (the result of Step 443 is "N") or when the process restart is unsuccessful (the result of Step 408 is "N"), the CPU 21 switches to a standby system with the lowest load (Step 444). When the switching to the standby system has been completed or the process has been restarted successfully (the result of Step 408 is "Y"), the system can be recovered (Step 410).

Figure 9A:
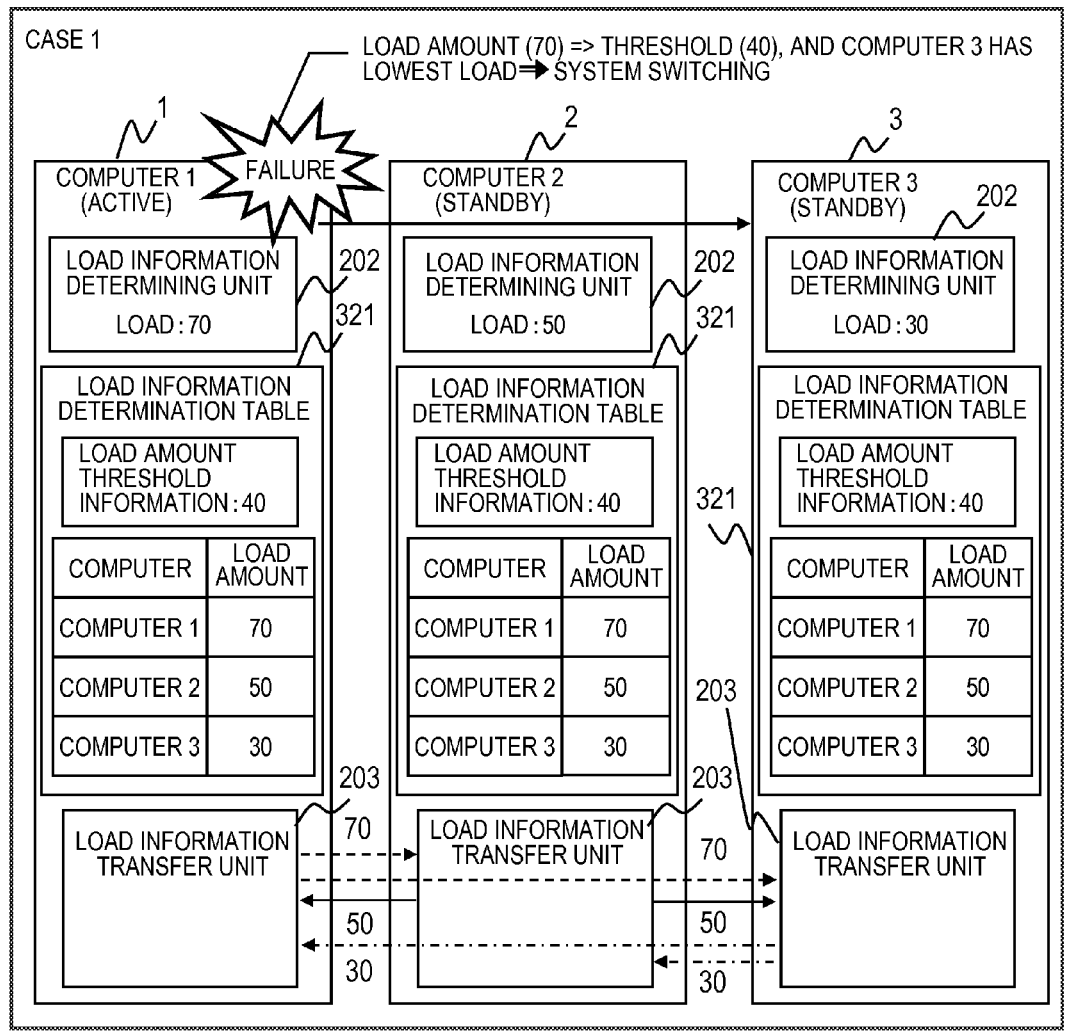
FIG. 9A is an explanatory diagram showing an example of a processing for recovery from a failure with restarting a process by the load information determining unit in accordance with the first embodiment of this invention.
Figure 9B:
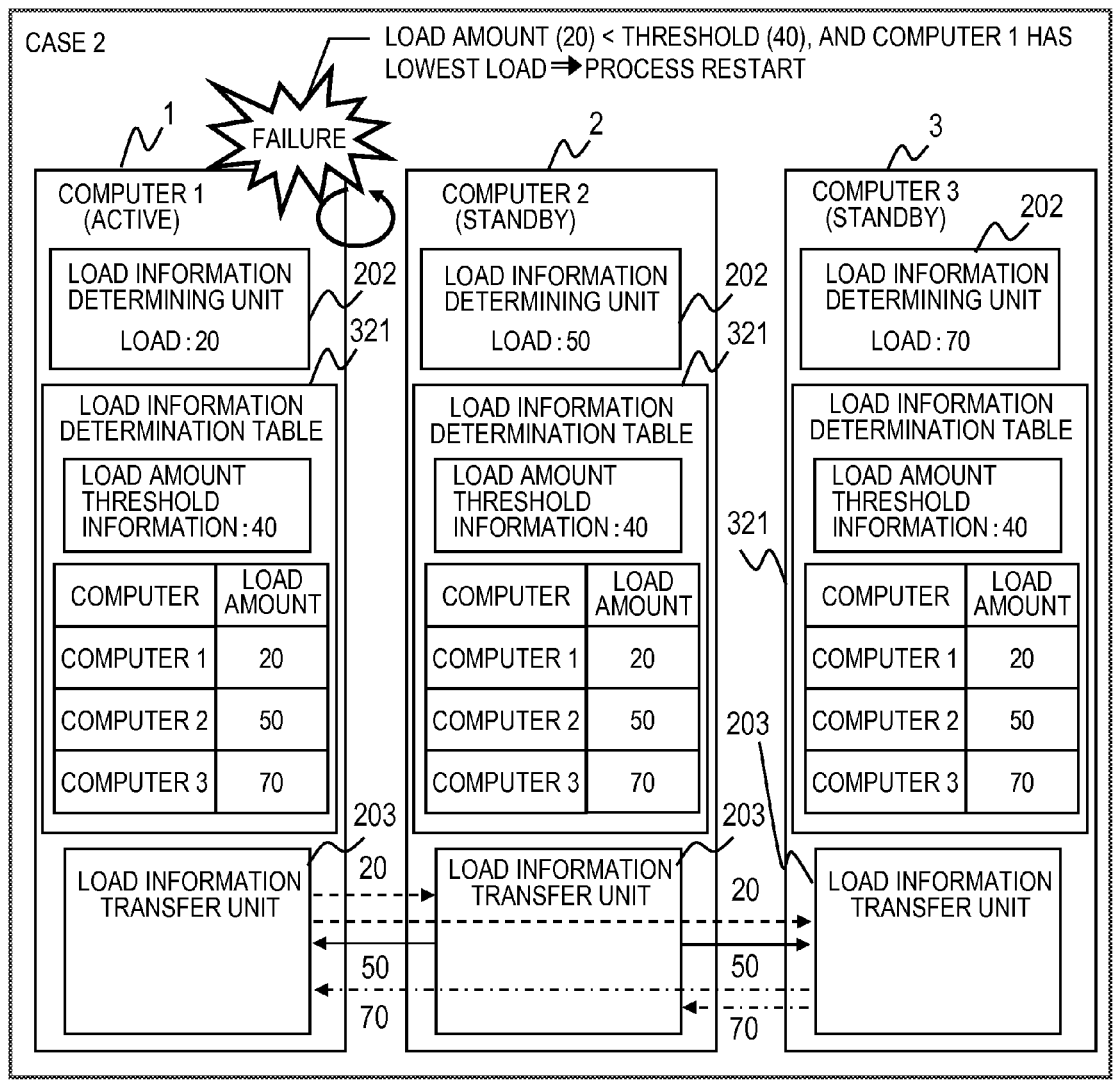
FIG. 9B is an explanatory diagram showing an example of a processing for recovery from a failure with switching to a standby system by the load information determining unit in accordance with the first embodiment of this invention.

FIGS. 9A and 9B are diagrams each showing an example of the processing for recovery from a failure by the load information determining unit 202 of the first embodiment of this invention.

The load amount is a relative value when the reference load amount is 100, and the higher the value is, the higher the load is.

Case 1 shown in FIG. 9A is an example in which a failure has occurred in a computer 1 with a high load. Since the load amount (70) of the computer 1 is higher than the threshold (40) and the load amounts of the other computers are lower than the load amount of the computer 1, switching to a standby system is made. In this case, switching is made to a computer 3 with the lowest load.

Case 2 shown in FIG. 9B is an example in which a failure has occurred in a computer 1 with a low load. Since the load amount (20) of the computer 1 is less than the threshold (40), process restart is executed. Even when the load amount of the computer 1 is equal to or more than the threshold, process restart is executed since the computer 1 is a computer with the lowest load.

Figure 10:
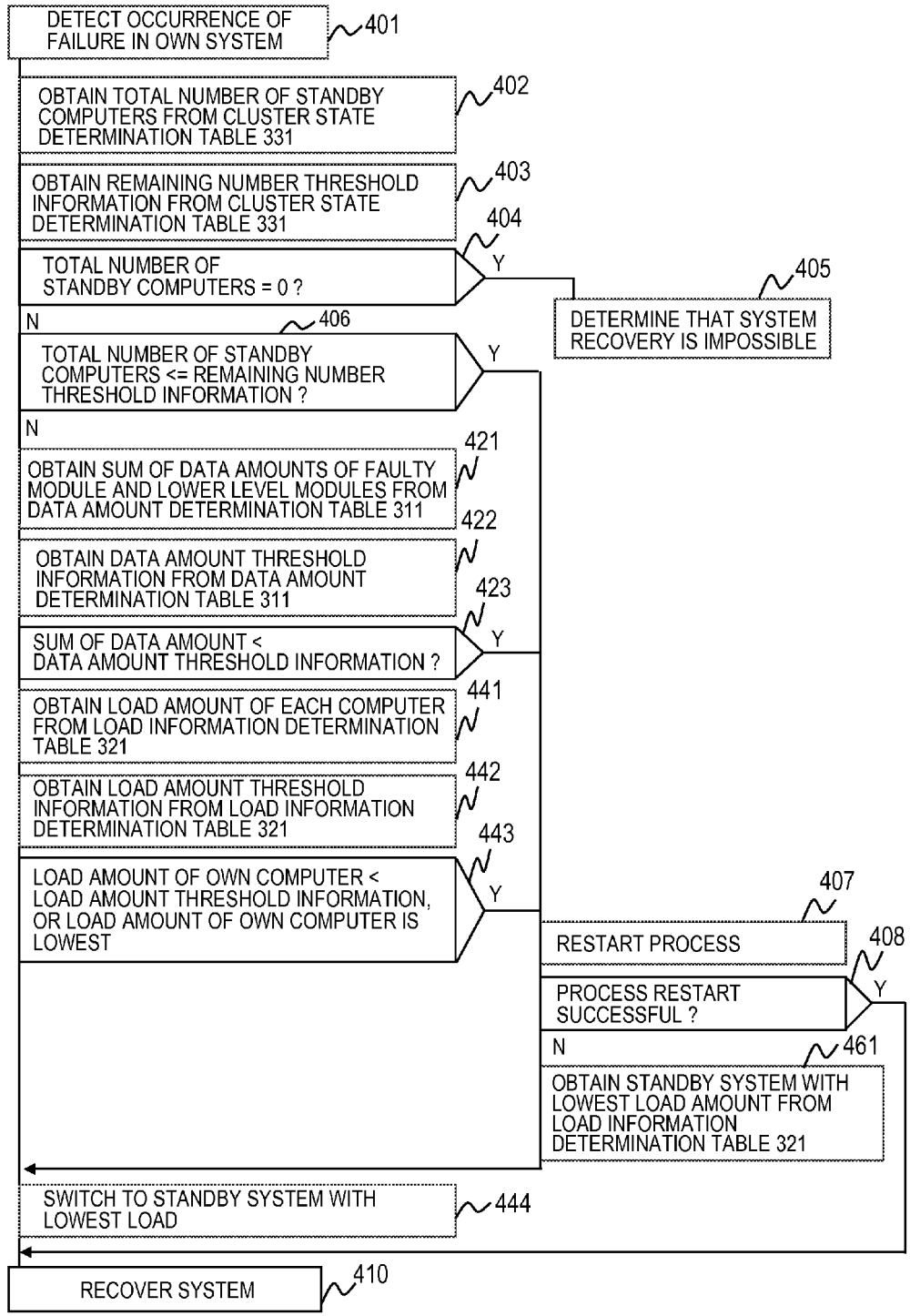
FIG. 10 is a diagram showing a procedure of a series of recovery processing when a failure has occurred in a active system in accordance with the first embodiment of this invention.

FIG. 10 is a diagram showing the procedure of a series of recovery processing when a failure has occurred in the active system of the first embodiment of this invention.

The recovery processing shown in FIG. 10 is a combination of the procedures shown in FIGS. 4, 6, and 8. The descriptions of the steps are as provided previously.

This processing is executed when a failure of the own system (active system) computer is detected by the cluster information management unit 301 (Step 401).

First, the CPU 21 compares the number of standby system computers with the value of the remaining number threshold information with reference to the cluster state determination table 331 (Steps 402 to 406). Since the highest priority is given to the prevention of loss of the processing data 103, control is performed so that a predetermined number or more of standby system computers holding the data of the active system are operated.

Then, the CPU 21 compares the amount of data obtained from a standby system to perform recovery from the failure with the value of the data amount threshold information with reference to the data amount determination table 311 (Steps 421 to 423). Then, when the amount of transferred data is smaller than the value of the data amount threshold information, the CPU 21 attempts to restart the process (Step 407). This is because the smaller the amount of transferred data is, the shorter the time required for the process restart is.

Lastly, the CPU 21 compares the load amount of each computer with the value of the load amount threshold information with reference to the load information determination table 321 (Steps 441 to 443). When the load amount of the own system computer is smaller than the value of the load amount threshold information or the load on the own system computer is the lowest in the system, the CPU 21 attempts to restart the process. When the load amount of the own system is equal to or more than the value of the load amount threshold information and the load amount of the own system is not the lowest in the system or the process restart is unsuccessful (the result of Step 443 is "N"), the standby system with the lowest load is obtained, and system switching is executed (Step 444).

According to the first embodiment of this invention, if all the standby systems hold the data necessary for the active system to be recovered, data loss can be prevented even when a failure continuously has occurred until the completion of the recovery of the process.

Moreover, according to the first embodiment of this invention, the speed and reliability of the failure recovery processing can be increased by performing either process restart or system switching based on the system state as process failure recovery means.

Second Embodiment

While the recovery determination table 303 is held by each computer in the first embodiment of this invention, the recovery determination table 303 is held by a management computer in the second embodiment of this invention. Further, the management computer determines the process failure recovery method, and instructs the computers to use the method.

Figure 11:
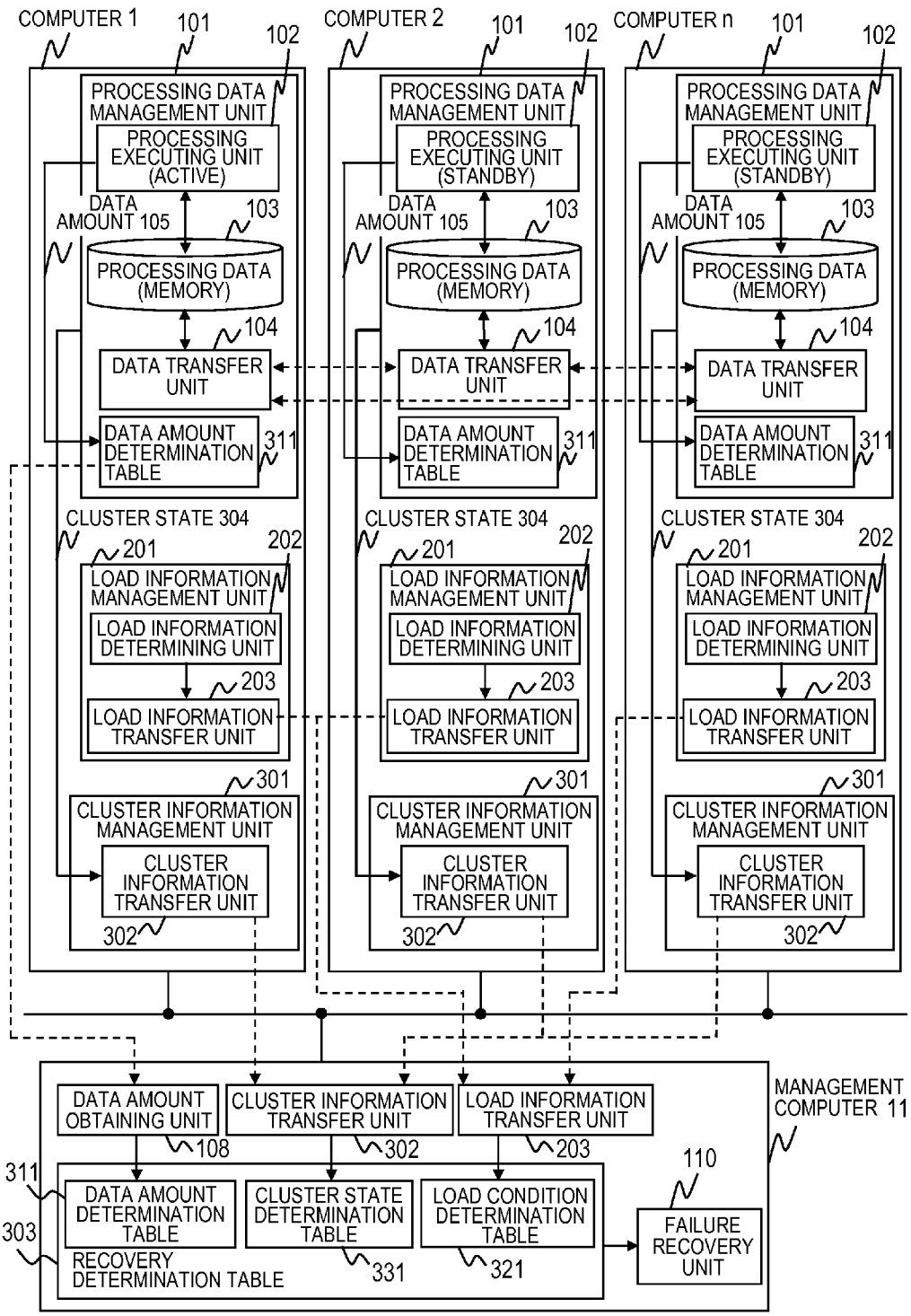
FIG. 11 is a block diagram showing an example of a system structure of a cluster system in accordance with a second embodiment of this invention.

FIG. 11 is a system block diagram showing an example of a cluster system of a second embodiment of this invention.

The cluster system of the second embodiment of this invention includes a management computer 11 in addition to the active system computer and the standby system computer (1 to n). The active system computer and the standby system computer (1 to n) and the management computer 11 are coupled through a network.

The management computer 11 holds the cluster state determination table 331 and the load information determination table 321, and determines whether to restart the process or switch to a standby system when a failure has occurred in the active system. When switching to a standby system is made, the management computer 11 selects the computer that takes over the processing.

The hardware structure of the management computer 11 is similar to the hardware structure of the computer shown in FIG. 2, and includes a CPU, a memory, an NIC, and an input/output device. The management computer 11 may be realized by a program executed on a virtual computer.

The management computer 11 includes the recovery determination table 303, a data amount obtaining unit 108, the cluster information transfer unit 302, the load information transfer unit 203, and a failure recovery unit 110.

The recovery determination table 303 includes the data amount determination table 311, the cluster state determination table 331, and the load information determination table 321 as in the first embodiment of this invention.

The data amount determination table 311 which is updated more frequently than the other information is stored in each computer because if the data amount determination table 311 stored in the management computer is updated whenever necessary, the network traffic may be increased to deteriorate the processing efficiency. In the second embodiment of this invention, the increase in network traffic is suppressed by the management computer 11 periodically obtaining the information of the data amount determination table 311 stored in the active system computer.

The data amount obtaining unit 108 obtains information from the data amount determination table 311 stored in the active system computer, and stores the information in the data amount determination table 311 of the management computer 11.

The cluster information transfer unit 302 receives the cluster information transmitted from the active system computer and the standby system computer, and stores the received cluster information in the cluster state determination table 331 of the management computer 11.

The load information transfer unit 203 receives the load information transmitted from the active system computer and the standby system computer, and stores the received load information in the load information determination table 321 of the management computer 11.

When a failure has occurred in the active system computer, the failure recovery unit 110 recovers the system based on the information stored in the recovery determination table 303. The recovery processing executed by the management computer 11 is similar to the recovery processing of the first embodiment of this invention shown in FIG. 10.

According to the second embodiment of this invention, as in the first embodiment of this invention, if all the standby systems hold the data necessary for the active system to be recovered, data loss can be prevented even when a failure has continuously occurred until the completion of the recovery of the process.

Moreover, according to the second embodiment of this invention, because information concerning each computer is unitarily controlled, it is not necessary that the information necessary for recovery be shared among all the computers. Consequently, the traffic of the network necessary to transfer the information necessary for recovery can be reduced.

Further, according to the second embodiment of this invention, because it is not necessary for each computer to monitor the other computers in the system, the load on each computer can be reduced.

While the present invention has been described in detail and pictorially in the accompanying drawings, the present invention is not limited to such detail but covers various obvious modifications and equivalent arrangements, which fall within the purview of the appended claims.

What is claimed is:

1. A method for recovering a failure that has occurred in a first computer, which is installed in a cluster system, the cluster system comprising the first computer and at least one second computer, wherein the first computer executes processing for providing service, and wherein the at least one second computer stores a copy of data processed by the first computer, the first computer having a first processor, a first storage unit coupled to the first processor, and a first interface coupled to the at least one second computer, each at least one second computer having a second processor, a second storage unit coupled to the second processor, and a second interface coupled to the first computer, the first storage unit storing data used for the processing, the cluster system storing system information including a state of the cluster system, the method comprising the steps of:

transmitting, by the first computer, the data stored in the first storage unit to a second computer of a group consisting of the at least one second computer;

storing, by the second computer, the data transmitted from the first computer in the second storage unit of the second computer;

when a failure has occurred in the first computer, making, by the first computer, a determination as to whether the processing in which failure has occurred is to be re-executed by the first computer or whether the processing in which failure has occurred is to be switched over to the second computer, wherein the determination is based on the system information;

when it is determined, based on the system information, that the processing in which the failure has occurred is to be re-executed by the first computer, transmitting, by the second computer, the data stored in the second storage unit to the first computer, storing, by the first computer, the data transmitted by the second computer in the first storage unit, and re-executing, by the first computer, the processing in which the failure has occurred; and when it is determined that the processing in which the failure has occurred is to be switched over to the second computer, executing, by the second computer, the processing in which the failure has occurred.

2. The method according to claim 1, further comprising:
re-executing, by the first computer, the processing in which the failure has occurred when the number of second computers is less than a predetermined threshold when the failure has occurred in the first computer.

3. The method according to claim 1, further comprising:
identifying, by the first computer, a module in which the failure has occurred;
obtaining, by the first computer, the data amount used by the identified module from the system information; and
re-executing, by the first computer, the processing in which the failure has occurred when the obtained data amount is less than a predetermined threshold.

4. The method according to claim 1, further comprising:
re executing, by the first computer, the processing in which the failure has occurred when a load on the first computer is less than a predetermined threshold when the failure has occurred in the first computer.

5. The method according to claim 4, further comprising:
selecting, by the first computer, a second computer having the lowest load when the load on the first computer is greater than or equal to the predetermined threshold; and
instructing the selected second computer to execute the processing in which the failure has occurred.

6. A first computer installed in a cluster system, the cluster system comprising the first computer and at least one second computer, wherein the first computer executes processing for providing service, and wherein the second computer stores a copy of data processed by the first computer, the first computer comprising:

a processor;

a storage unit coupled to the processor; and an interface coupled to the at least one second computer, wherein the storage unit stores data used for the processing, and stores system information including a state of the cluster system, wherein the processor transmits the data stored in the storage unit to a second computer of a group consisting of the at least one second computer, wherein when a failure has occurred in the first computer, the processor makes a determination as to whether the processing in which failure has occurred is to be re-executed by the first computer or whether the processing in which the failure has occurred is to be switched over to the second computer, wherein the determination is based on the system information, wherein when it is determined, based on the system information, that the processing in which the failure has occurred is to be re-executed by the first computer, the processor obtains from the second computer a copy of the data transmitted by the first computer to the second computer stores the obtained data in the storage unit, and re-executes the processing in which the failure has occurred, and wherein when it is determined that the processing in which the failure has occurred is to be switched over to the second computer, the processor instructs the second computer to execute the processing in which the failure has occurred.

7. The first computer according to claim 6,
wherein the processor re-executes the processing in which the failure has occurred when the number of second computers is less than a predetermined threshold when the failure has occurred in the first computer.

8. The first computer according to claim 6,
wherein the processor identifies a module in which the failure has occurred, obtains the data amount used by the identified module from the system, information and re-executes the processing in which the failure has occurred when the obtained data amount is less than a predetermined threshold.

9. The first computer according to claim 6,
wherein the processor re-executes the processing in which the failure has occurred when the load on the first computer is less than a predetermined threshold when the failure has occurred in the first computer.

10. The first computer according to claim 9,
wherein the processor selects a second computer having the lowest load when the load on the first computer is greater than or equal to the predetermined threshold when the failure has occurred in the first computer, and instructs the selected second computer to execute the processing in which the failure has occurred.

11. A cluster system comprising:
a first computer that executes processing for providing service;
at least one second computer that stores a copy of data processed by the first computer; and
a management computer that manages the first computer and the at least one second computer,
wherein the first computer comprises: a first processor; a first storage unit coupled to the first processor; and a first interface coupled to the second computer, wherein each at least one second computer comprises: a second processor; a second storage unit coupled to the second processor; and a second interface coupled to the first computer, wherein the management computer comprises: a third processor; a third storage unit coupled to the third processor; and a third interface coupled to the first computer and the at least one second computer, wherein the first storage unit stores data used for the processing, wherein the third storage unit stores system information including a state of the cluster system, wherein the first computer transmits the data stored in the first storage unit to the at least one second computer, wherein the at least one second computer stores the data transmitted from the first computer in the second storage unit, wherein when a failure has occurred in the first computer, the management computer makes a determination as to whether the processing in which failure has occurred is to be re-executed by the first computer or whether the processing is to be switched over to the at least one second computer, wherein the determination is based on the system information, wherein when it is determined, based on the system information, that the processing in which the failure has occurred is to be re-executed by the first computer, the management computer provides an instruction to the first computer to re-execute the processing in which the failure has occurred, wherein when the first computer receives the instruction to re-execute from the management computer, the first computer obtains from a second computer of the at least one second computer the data stored in the second storage unit, stores the data obtained from the second computer in the first storage unit, and re-executes the processing in which the failure has occurred, wherein when it is determined that the processing in which the failure has occurred is to be switched over to the at least second computer, the management computer selects a second computer, from the group consisting of the at least one second computer, to execute the processing in which the failure has occurred, and instructs the selected second computer to execute the processing in which the failure has occurred, and wherein the selected second computer executes the processing in which the failure has occurred.

12. The method according to claim 1, wherein the system information comprises:
    a number of second computers included in the cluster system, the number indicating an amount of second computers included in the cluster system;
    a data amount used by each module constituting the processing executed by the first computer; and
    load information regarding the first computer and the second computer.

13. The first computer according to claim 6, wherein the system information comprises:
    a number of second computers included in the cluster system, the number indicating an amount of second computers included in the cluster system;
    a data amount used by each module constituting the processing executed by the first computer; and
    load information regarding the first computer and the second computer.

14. The cluster system according to claim 11, wherein the system information comprises:
    a number of second computers included in the cluster system, the number indicating an amount of second computers included in the cluster system;
    a data amount used by each module constituting the processing executed by the first computer; and
    load information regarding the first computer and the second computer.

* * * * *